(12) United States Patent
Popp et al.

(10) Patent No.: US 12,395,746 B2
(45) Date of Patent: Aug. 19, 2025

(54) DISTRIBUTED MONITORING SYSTEM FOR FILM RECORDINGS

(71) Applicant: Arnold & Richter Cine Technik GmbH & Co. Betriebs KG, Munich (DE)

(72) Inventors: Hermann Popp, Munich (DE); Frank Zeidler, Munich (DE); Alexander Mann, Munich (DE); Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 79 days.

(21) Appl. No.: 18/113,744

(22) Filed: Feb. 24, 2023

(65) Prior Publication Data
US 2023/0269494 A1   Aug. 24, 2023

(30) Foreign Application Priority Data
Feb. 24, 2022 (DE) .................. 10 2022 104 410.6

(51) Int. Cl.
*H04N 23/84* (2023.01)
*G06T 3/4053* (2024.01)
*G09G 5/06* (2006.01)

(52) U.S. Cl.
CPC .......... *H04N 23/84* (2023.01); *G06T 3/4053* (2013.01); *G09G 5/06* (2013.01)

(58) Field of Classification Search
CPC .... H04N 23/84; H04N 21/4223; H04N 21/84; H04N 7/183; H04N 7/181; H04N 5/76;
(Continued)

(56) References Cited

U.S. PATENT DOCUMENTS 10,909,586 B2 *  2/2021  Avedissian .......... H04N 21/4756
2008/0016541 A1   1/2008  Murakami et al.
(Continued)

FOREIGN PATENT DOCUMENTS

EP   3123708 B1    8/2019
WO   2016134318 A1  8/2016

OTHER PUBLICATIONS

German Patent and Trademark Office Search Report issued in Application No. 10 2022 104 410.6, dated Oct. 10, 2022.
(Continued)

*Primary Examiner* — Padma Haliyur
(74) *Attorney, Agent, or Firm* — Amster, Rothstein & Ebenstein LLP

(57) ABSTRACT

The present invention relates to a distributed monitoring system for film recordings comprising a transmission module and a display module, wherein the transmission module and the display module are connected to one another via a data network, wherein the transmission module is configured to transmit image data and preferably also audio data via the data network to the display module, wherein the transmission module additionally transmits metadata to the display module, wherein the display module is configured to display the image data and the metadata, and the display module has an image processing unit that is configured to carry out a modification to the image data before the image data are displayed.

30 Claims, 6 Drawing Sheets

Figure 1:
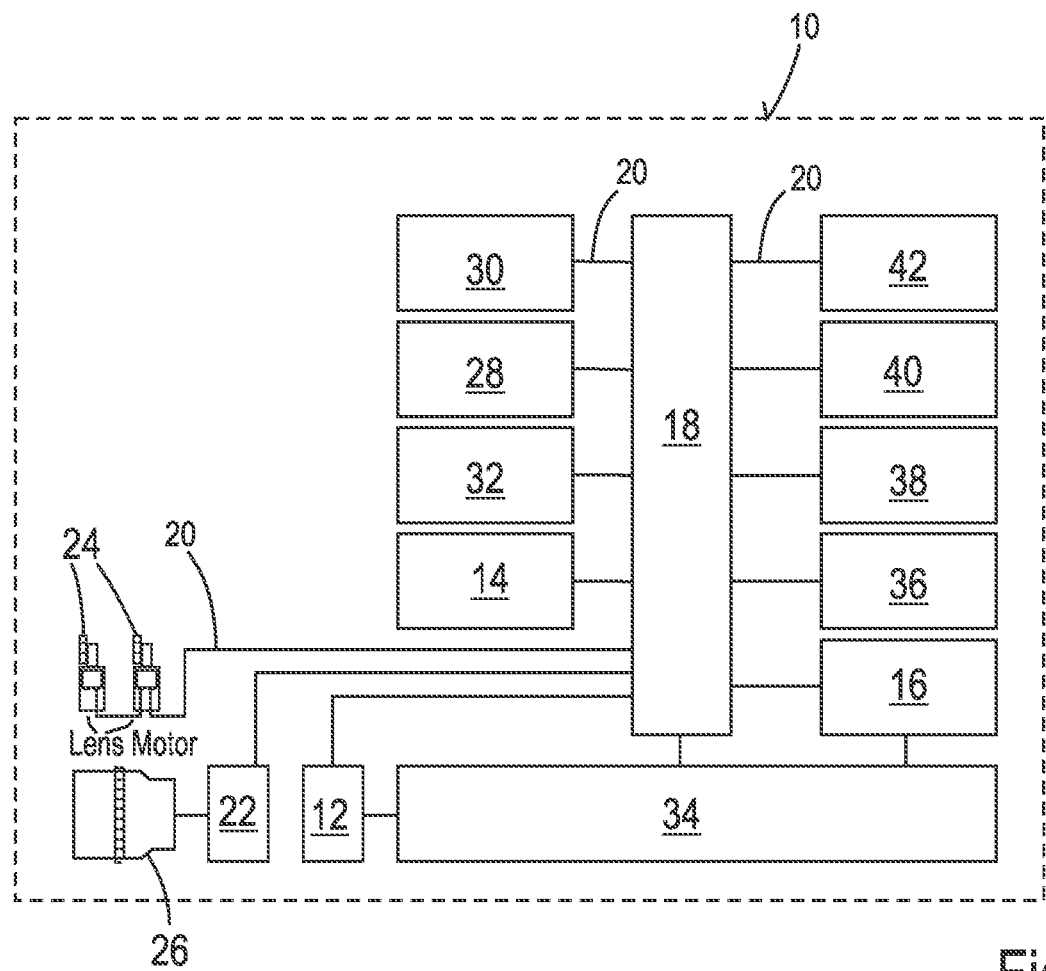

(58) Field of Classification Search
CPC ... H04N 21/21805; G06T 3/4053; G09G 5/06
See application file for complete search history.

(56) References Cited

U.S. PATENT DOCUMENTS

| | | | |
|---|---|---|---|
| 2010/0111489 | A1 | 5/2010 | Presler |
| 2014/0373054 | A1* | 12/2014 | Edwards .......... H04N 21/41265 |
| | | | 725/110 |
| 2017/0188013 | A1* | 6/2017 | Presler ................. H04N 23/661 |
| 2018/0054595 | A1* | 2/2018 | Odamaki ............... H04N 23/50 |
| 2018/0098025 | A1* | 4/2018 | Woo ...................... G06T 1/0021 |
| 2019/0342524 | A1* | 11/2019 | Joao ........................ G08B 25/14 |
| 2020/0344367 | A1* | 10/2020 | Jones ................. H04N 1/00095 |
| 2022/0182528 | A1* | 6/2022 | Mitani ................... H04N 23/73 |
| 2023/0093631 | A1* | 3/2023 | Kim ..................... H04N 21/235 |
| | | | 348/159 |

OTHER PUBLICATIONS

European Patent Office Search Report issued in Application No. 23155957.6, dated Mar. 14, 2023.
European Patent Office Communication issued Application No. 23155957.6, dated Apr. 4, 2025.

\* cited by examiner

DISTRIBUTED MONITORING SYSTEM FOR FILM RECORDINGS

The present invention relates to a distributed monitoring system for film recordings.

Professional film cameras, such as are used in film and television productions, usually generate different output variants of the image data acquired by the film camera in the camera itself. These output variants of the image data are then, for example, output to different monitors on the film set so that the acquired image data may be viewed on the monitors, for example, in different representations in each case.

It is therefore desired to generate different image data, wherein, for example, a false color representation may be required on one monitor, a color correction may be required on another monitor and the representation of a focus indication may be required on a further monitor. Such different representations have to be generated by the film camera, wherein the number of possible different representations is usually limited by the hardware and software resources of the film camera. All the monitoring requirements may then possibly not be met.

It is therefore the underlying object of the invention to specify a monitoring system that is flexibly adaptable to different monitoring requirements.

This object is satisfied by a monitoring system in accordance with claim 1.

In accordance with the invention, a distributed monitoring system for film recordings is specified that comprises a transmission module and a display module, wherein the transmission module and the display module are connected to one another via a data network. The transmission module is configured to send or to transmit image data and preferably also audio data via the data network to the display module, wherein the transmission module additionally transmits metadata to the display module, wherein the display module is configured to enable, in particular to selectively enable, a display of the image data and the metadata. Furthermore, the display module has an image processing unit that is configured to carry out a modification to the image data before the image data are displayed.

The transmission module may in particular be part of a film camera, as will be explained in more detail below.

In accordance with the invention, image data are therefore provided via the data network for the display module (i.e., for example, a monitor) by the transmission module, wherein the display module is, however, configured to carry out a modification to the image data. This has the advantage that the transmission module e.g. only has to play out one variant of the image data. A desired modification to the image data (e.g. to display false colors or to make a color change) may then be carried out by the display module. The transmission module or the camera then has to deliver less computing power and does not have to provide different variants of the image data, for example.

It may be sufficient for the transmission module to transmit exactly one variant of the image data to the data network. A plurality of display modules may be connected to the data network, wherein the different display modules may make different modifications to the image data and may thus display different variants of the image data. The monitoring system may therefore be easily expanded and may thus be flexibly adapted to the respective monitoring task.

Due to the lower computing power required in the transmission module or the camera, the camera may preferably be designed smaller and/or may enable a longer operation with one battery charge.

The transmission module may preferably also transmit audio data to the data network, wherein the audio data may be played back and also modified by the display module or the display modules.

Furthermore, it is possible for the transmission module to simultaneously transmit image data of different qualities, i.e. different variants of the image data, via the data network. Thus, three different resolutions (for example, SD, HD and 4K) may e.g. be simultaneously transmitted in the image data, in particular in different data streams. The display module may then e.g. use that variant of the image data that may be displayed with the smallest modification to the image data. The image data or the variants of the image data may also only comprise image sections such as the region of interest (ROI) of an autofocus system.

If image data of different qualities are simultaneously provided by the transmission module, the case arises that more image data are present in the data network than a single display module would actually require. However, this is advantageous if different display modules are present that may then take on different qualities of the image data from the data network.

It is likewise possible for the transmission module to simultaneously transmit audio data of different qualities, i.e. different variants of the audio data, via the data network. The above statements on the image data then apply accordingly to the audio data.

By using the data network, the display modules may not only, for example, display the image of a camera or the image data of a transmission module, but it is possible to choose between the display of different transmission modules/cameras present in the data network.

For example, the display module may be a viewfinder of a camera (Electronic View Finder—EVF). Thus, not only image data of the directly connected camera, but also of further cameras may be easily viewed in the viewfinder of the camera. The data network accordingly serves as a virtual crossover switch.

To reach a plurality of display modules with the image data via the data network, the transmission module may use a multicast and/or a broadcast to transmit the image data and/or the audio data and/or the metadata to the display modules.

The metadata may be additional information about the image data and/or audio data that, for example, include the recording camera, the color profile, the camera position and the like.

The transmission of the image data and/or the audio data via the data network may, for example, take place by means of a data stream that is divided into data packets. The display module then receives the data stream, preferably carries out a modification to the image data and then displays the image data. The image processing unit of the display module is used to modify the image data. To enable the display of the modified image data, the display module may have a display or another display device. Alternatively, the display module may not comprise its own display, but may only have interfaces (e.g. HDMI) for displays or other display devices to be connected externally. The modification to the image data preferably takes place in real time so that practically no time offset is generated by the modification.

Advantageous embodiments of the invention can be seen from the description, from the drawings and from the dependent claims.

In accordance with a first embodiment, the modification to the image data comprises a change in the resolution, a change in the color space, a change in the image refresh rate, a color change and/or a false color representation. Such modifications to the image data are often required on set since the recording of the image data usually takes place with so-called "flat" color profiles, for example, with Log C. However, it may be desired to immediately gain an impression through the display module as to how the image data will look later, e.g. after a color change (i.e. after a so-called "color grading"). A changed impression of the image data may also result due to a change in the color space, a change in the image refresh rate or a false color representation. Alternatively or additionally, a green screen effect may e.g. be displayed by the display module.

In accordance with a further embodiment, the image processing unit is configured to apply a lookup table (LUT) to the image data in order to change the color space and/or for the color change. Due to such an LUT, flat non-saturated colors e.g. of a logarithmic recording profile may be displayed such that they approximate a display after the color grading. In this way, a better impression of the generated image data may be obtained. The image processing unit may in particular be configured to apply a 1D or 3D LUT to the image data obtained from the transmission module.

In accordance with a further embodiment, the display module is configured to superpose at least a portion of the metadata on the image data during the display and, for example, to superpose a focus indication and/or an exposure indication on the image data. Due to such an overlay, it may, for example, be identified where focused, overexposed and/or underexposed regions are located. Alternatively or in addition to the metadata, the display module may also be configured to display the aforementioned changes in the resolution, changes in the color space, changes in the image refresh rate, color changes and/or false color representations as an overlay. The overlay may therefore preferably be generated and/or calculated in the display module. The generation and/or calculation preferably takes place in real time so that virtually no time offset is generated by the overlay.

In accordance with a further embodiment, the metadata comprise camera status information, color space information, focus information, exposure information and/or waveform information. The camera status information may, for example, comprise a current operating mode, the display of a current recording of image data, the charge level and the like. The color space information may be the so-called gamut, i.e. the part of the color space that may be included in the image data. The focus information may in particular comprise a focus point and/or a focus distance. The exposure information may, for example, comprise an exposure duration and/or a sensitivity of the image sensor during the recording of the image data (e.g. in an ASA/EI/ISO format). The exposure information may furthermore indicate overexposed and/or underexposed regions. The waveform information may, for example, be a histogram or different scopes. The scopes may, for example, specify a brightness distribution in accordance with different colors or color channels.

In accordance with a further embodiment, the display of the display module may take place in a calibrated manner. The display or the other display unit of the display module may accordingly be calibrated to reproduce colors correctly. Calibration data of the display module may preferably be stored in a storage unit that is accessible from the display module via the data network, for example, in a cloud, in a Network Attached Storage (NAS), in an On-Premise Server and the like. The calibration data may then be easily retrieved by the display module.

In accordance with a further embodiment, the display module and the transmission module are configured to communicate bidirectionally with one another via the data network. Due to the bidirectional communication, a cooperation of the display module and the transmission module becomes possible. This is, for example, not possible with the SDI interface (Serial Digital Interface) since no feedback takes place there. For example, the display module may request image data, audio data and/or metadata in the transmission module. Due to the bidirectional communication, it is furthermore possible for users to no longer have to perform configurations for their signal path e.g. at the camera or at the transmission module or by means of special remote control devices. Instead, the configuration of the transmission of the image data via the data network may now be performed at the display module. Due to the bidirectional communication, provision may also be made to perform a remote control of the transmission module or of a camera system comprising the transmission module. For example, the control of a focus assist system and/or an autofocus system may take place at the display module. Furthermore, due to the bidirectional communication, it is possible to recognize modules that are currently not required (e.g. modules whose data are currently not being processed by any other module) and to switch off the modules that are not required in order to save energy.

As already stated above, the display module may be configured to request the transmission of the image data, the audio data and/or the metadata in the transmission module. After the request, the display module may record, i.e. store, the image data, audio data and/or metadata. The display module may in particular record the original image data received from the transmission module and/or the image data as displayed (e.g. with a color change or the like). Additional information that may, for example, be helpful in post-production may also be entered at the display module. Such additional information may also be recorded.

In accordance with a further embodiment, the transmission module is a camera or a part of a camera, wherein the image data have been acquired by the image sensor of the camera. The image data acquired by the camera are preferably transmitted to the data network by means of the transmission module directly after the recording by the camera so that a live image may result on the display modules. The transmission module may in particular be part of an image acquisition module and/or an image processing unit. The transmission module may accordingly be configured to output the image data directly via the data network after the acquisition by the image sensor. Consequently, only a low latency may be present. In particular, no buffering of more than e.g. 10 seconds or of more than e.g. 2 seconds is performed. A latency is usually well below 1 second; the latency is preferably less than 40 ms, i.e. less than the duration of one frame.

In accordance with a further embodiment, the transmission module is configured to transmit the image data via the data network at a frame rate that corresponds to the frame rate on the acquisition by the image sensor or to the frame rate of an image acquisition module. Accordingly, the frame rate which the image sensor or an image acquisition module comprising the image sensor outputs may be output directly to the data network. Thus, for example, a computationally intensive conversion of the frame rate is not necessary in the camera since such a conversion may take place in the display module. The camera may accordingly be smaller, more compact and more energy-efficient.

The camera is in particular a camera for professional film recordings, in particular configured for recording moving images (videos), still images and single images and/or time lapse recordings, wherein the camera may e.g. have an exchangeable lens. The camera (or the image acquisition module) may e.g. be configured for recording image data at a resolution of at least 4K, 4.5K or 8K at frame rates of 60 FPS, 90 FPS, 100 FPS or 150 FPS.

In accordance with a further embodiment, the camera is a modular electronic camera, and in particular a distributed electronic camera, wherein the camera has the image acquisition module comprising the image sensor and an image processing unit coupled to the image sensor. The camera comprises a first functional module, for example an operating module for controlling and/or configuring the camera. The image acquisition module, the functional module and the display module (which may also be a second functional module) are camera modules, wherein the image acquisition module, the operating module and the display module are connected to one another by means of the data network, wherein the data network has a distribution unit that is configured to receive data via the data network from the camera modules and to forward data from one of the camera modules to at least one of the other camera modules.

The image processing unit preferably converts the camera into a digital format that may be sent via the data network. The camera images may be available as single images and/or as video. For example, the camera images may be transmitted as a stream via the data network.

A functional module in particular serves to provide a respective portion of the functions of the camera. A functional module may be one of the camera modules mentioned herein.

The operating module may have a human-machine interface (HMI), for example, in the form of a touch screen or an arrangement of switches and/or a display. The operating module may, for example, serve to start and/or to stop the recording of camera images, to set a frame rate when recording camera images, a color depth and the like.

As mentioned, the camera may be a modular camera in which the individual camera modules are coupled by means of the data network. By coupling the display module to the same data network, the effort for the monitoring may be reduced. Furthermore, there is the possibility of other camera modules also receiving and using the image data, audio data and/or metadata transmitted by the transmission module into the data network. As mentioned, the transmission module may, for example, be part of the image acquisition module.

The distribution unit preferably comprises a network switch, a hub, a router and/or a gateway. The distribution unit may also be one of the network components mentioned. The distribution unit preferably has network ports to each of which a camera module may be connected. The ports may support different transmission speeds, for example, 10 Mbit, 100 Mbit, 1 Gbit, 10 Gbit, 100 Gbit or 400 Gbit.

If the distribution unit is a hub, all the data arriving from the camera modules at the distribution unit will be forwarded to all the other camera modules. In the case of a switch, a router and/or a gateway, the incoming data may be forwarded in a targeted manner to specific camera modules. For this purpose, the distribution unit then includes information about which camera module is connected to which network port. By using, for example, a switch, there is thus the advantage that data intended only for a respective camera module are forwarded to this camera module by the distribution unit. The present transmission bandwidth of the data network is consequently not unnecessarily exhausted.

In accordance with a further embodiment, the distribution unit is designed in a cascaded manner and/or from part units. The distribution unit may, for example, be "stacked" or have sub-units ("cascaded"). It is only relevant that the components of the distribution unit may communicate with one another so that a communication of the camera modules among one another is possible via the data network. Alternatively, the possibility exists of the distribution unit having only exactly one component, for example, only one switch.

In distributed and/or cascaded distribution units, it is also possible for at least some of the camera modules to each comprise a part of the distribution unit. For example, some of the camera modules may each have their own switch so that a plurality of such camera modules may be connected in a chain by means of network cables. In this respect, each camera module may, for example, have at least two network sockets.

In accordance with a further embodiment, at least one of the camera modules, in particular after the connection to the data network, transmits a device profile via the data network, wherein the device profile comprises a device class of the camera module and information about the functional scope of the camera module. The camera adapts its operating parameters based on the transmitted device profile or the transmitted device profiles in order to integrate the transmitting camera module into the operation of the camera. In other words, the camera therefore evaluates the device profiles of the connected camera modules in order e.g. to adapt the operation of the camera to the connected camera modules and, if necessary, to optimize it to the camera modules.

For this purpose, the camera may have a control unit that evaluates the device profiles of the camera module or of the camera modules. The control unit may in each case perform and/or initiate the steps described herein. A camera module or the distribution unit may in particular perform the functions of the control unit.

The device profiles make it possible to provide a standardized data format by encapsulating and/or describing the functionalities of the camera modules by means of the device profiles, whereby a uniform format for exchanging capabilities and restrictions between the camera and the camera modules is provided. With the device profile, the camera modules in particular in each case communicate their requirements and also information about their functional scope to the camera.

Due to the transmission of the device profiles, the camera may then react sensibly to almost any camera modules and also to new camera modules without a change of the firmware and/or software of the camera being required. The development effort for integrating new and/or other accessories (i.e. camera modules) may thus be significantly reduced.

Due to the connection and the integration into the operation of the camera, the respective camera module itself becomes part of the camera. The camera module may in particular only make the camera fully functional, for example, when the camera module is a lens or an image acquisition module.

After connecting the camera modules via the data network, an exchange of the device profiles may also take place. This means that the newly connected camera module also receives the device profiles via the data network from camera modules already present in the camera. The newly connected camera module may then preferably also adapt its operation to the already present camera modules.

To integrate a newly connected camera module into the operation of the camera, the camera changes its operating parameters. The operating parameters may, for example, define the data format and/or the protocol by means of which communication with the newly connected camera module takes place via the data interface. However, the operating parameters may also, for example, comprise a frame rate and/or or a resolution of the camera images acquired by the camera. If a memory module is, for example, connected as a new camera module to the camera and at most supports a resolution of 4K at a frame rate of 60 FPS, the operating parameters may be set such that camera images with a resolution of 4K and a frame rate of 60 FPS are generated and/or are transmitted at least in this format to the memory module. In general, the operating parameters are to be understood as all the settings of the camera that may have an effect on the operation of the camera.

The device class may, for example, specify whether the camera module is an image acquisition module, a memory module or a playback module. The information about the functional scope may e.g. specify the maximum resolution, the frame rate, the color depth and the like for the image acquisition module. The storage capacity may e.g. be specified for the memory module and the playable file formats may e.g. be specified for the playback module.

Due to the device class included in the device profile, the camera may adapt its operating parameters as a fallback position e.g. to a standard device, in particular a predefined standard device, of this device class. In this way, newly developed camera modules may also be integrated into the operation of the camera even if the newly developed camera modules have functions that are not supported by the camera. In this case, at least basic functions (e.g. the functions of the standard device) may nevertheless be usable. For example, a novel distance measurement system that has a plurality of measurement points may nevertheless be used at an existing camera since it is recognized as belonging to the distance measurement system device class and e.g. also provides a value that corresponds to an existing single-point distance measurement device. In this way, a software update for existing devices may be avoided during the market launch of new camera modules.

In accordance with a further embodiment, the transmission module is configured to scale and/or to compress the image data, in particular only to scale and/or to compress the image data. The scaling and/or compression of the image data is usually possible with little computational effort. A color grading would, for example, require significantly more computational effort. Due to the scaling and/or compression of the image data, an overloading of the data network may be prevented. In particular, only a scaling and/or a compression may take place in the transmission module or in the camera. All further image processing steps prior to displaying the image data on the display module preferably take place in the display module. Preferably, for example, no color change or no change in the frame rate takes place in the image acquisition module and/or in the transmission module.

In accordance with a further embodiment, the transmission module is configured to perform the scaling and/or compression of the image data based on the settings of the display of the image data on the display module. This means that the transmission module may be configured to receive information from the display module connected via the data network as to how the image data are displayed by the display module (e.g. with what resolution or in what quality). Based on this information, the scaling and/or compression of the image data may accordingly be performed in order to minimize the transmission bandwidth required in the data network by the image data. If the display module is, for example, a viewfinder and only has a low resolution, the transmission module may perform a greater scaling. If a plurality of display modules are connected to the transmission module via the data network, the transmission module may select the scaling and/or compression such that the display module that displays the image data with the best quality and/or best resolution also receives suitable image data.

A display module may in particular also request image data, e.g. with a detail enlargement, in the transmission module, e.g. in accordance with a so-called "pixel by pixel zoom". The image data with the detail enlargement may also be transmitted as additional image data (in addition to image data without an enlargement).

In accordance with a further embodiment, the transmission module is configured to transmit the image data, the audio data and/or the metadata in separate data streams via the data network, preferably in synchronized data packets. Due to the transmission in separate data streams, an increased flexibility results. If the display module, for example, does not play back sound, the data stream comprising audio data does not have to be processed. Alternatively, it is, however, also possible to transmit the image data, audio data and/or metadata in the same data stream and/or in common data packets via the data network.

In accordance with a further embodiment, the image data have a color space that is larger than the color space of Rec.709. The image data therefore have a large color space. Such a large color space is necessary so that various display profiles and color changes become possible in the first place. For example, the image data may have the P3 or Rec.2020 color space. In connection with a recording in Log C, this may also be referred to as "Alexa Wide Gamut".

In accordance with a further embodiment, the monitoring system comprises one or more further display modules that are connected to the transmission module via the data network, wherein the further display modules are configured to display, in particular to selectively display, the image data and the metadata. The further display modules each have their own image processing unit and/or a separate image processing unit that is in each case configured to carry out a modification to the image data before the image data are displayed. The further display modules in particular have the same properties as the (first) display module described above. A different modification to the image data may be carried out with different display modules, depending on whether the display module is e.g. a viewfinder or another monitoring device.

The display modules may preferably be dedicated hardware, for example, a display with a touch function or a display that may be controlled with a handheld unit, e.g. a wired handheld unit. Alternatively, the display module may also be mapped in software, e.g. on a server, a personal computer or a mobile device. The calculations of the image processing unit may then be performed on the server, the personal computer or the mobile device.

The display module or the display modules may, for example, be directly connected to ports of the data network that are provided in or at the transmission module. Alternatively or additionally, at least one network component for distributing the image data, audio data and/or metadata is interposed between the transmission module and the display module in the data network, wherein the network component preferably comprises a network switch, a hub, a router and/or a gateway. The network component for distributing the image data, audio data and/or metadata may in particular be the aforementioned distribution unit of the modular camera. Alternatively, the network component for distribution may also be an additional network component. The network component e.g. distributes a data stream of the image data and thus enables a simple connection of further display modules. The transmission module may in particular use a multicast and/or a broadcast to simultaneously play out the image data to all the display modules. In this way, a separate data stream does not have to be generated for each display module.

In accordance with a further embodiment, the display modules are configured to display the image data in a synchronized manner. The image data on the different display modules may therefore be displayed such that the same time code is shown in each case. In this connection, the display modules may be configured to each have the same processing latency for the modification to the image data. An additional processing latency may in particular be artificially inserted by the image processing units so that all the display modules have the same processing latency.

To avoid a delay of the image data in the data network, the image data may be formed (e.g. by scaling and/or compression) such that the image data only occupy a predetermined portion, in particular only 60%, only 50%, only 40% or only 30%, of the transmission capacity of the data network. If the transmission capacity of the data network is not exhausted, small collisions result, whereby the run times to different display modules are almost the same. In this way, the image data may be displayed in a synchronized manner on the display modules.

Furthermore, the display modules and/or the transmission module may be time-synchronized, in particular by means of the Precision Time Protocol (PTP) or by Time-Sensitive networking (TSN). Due to the synchronization by means of PTP, a synchronization with an accuracy in the range of microseconds, when executed by means of hardware even an accuracy in the range of nanoseconds, may be achieved. When using PTP, the delays in the transmission via the data network are determined so that an internal time base of the display modules and/or the transmission module may be adapted to one another. In this way, the image data may be displayed in a synchronized manner on the display modules.

Furthermore, when using a real-time capable fieldbus, the time synchronization may be inherent to the data network and thus to the display modules.

In accordance with a further embodiment, the data network comprises an Ethernet network, a fieldbus network or a non-IP network (NIN). Alternatively, the data network is one of the aforementioned networks.

Ethernet, for example, defines wired data networks, with transmission rates between 1 Mbit and 400 Gbit. In an Ethernet network, both the physical layer (OSI Layer 1) and the data link layer (OSI Layer 2) are predefined. The data network may at least sectionally also be formed by a WLAN (Wireless Local Area Network). In this case, one or more camera modules and/or the distribution unit may comprise a WLAN transceiver so that camera modules may also be integrated into the data network by means of WLAN.

A fieldbus network may, for example, provide a real-time capability. The fieldbus network may alternatively or additionally be Ethernet-based. The fieldbus network may e.g. be EtherCAT, EIP, Sercos III and the like. The non-IP network (NIN) may in particular be a stream-based network instead of a packet-based network.

In accordance with a further embodiment, the distribution unit is configured to communicate with the camera modules, and in particular with the display module and the transmission module, via the data network by means of the same protocol. The use of a plurality of protocols is also possible that are available for the communication with the camera modules, wherein a suitable protocol is selected in each case that is preferably mastered by the transmitting and the receiving camera module. Advantageously, no protocol conversion is thus necessary. The same protocol or the same protocols may be protocols from the OSI layers 3, 4, 5, 6 and/or 7. For example, TCP (Transmission Control Protocol) and/or UDP (User Datagram Protocol) may be used as the transport protocol. Furthermore, RTP (Real-Time Transport Protocol) may be used, in particular for real-time critical data.

In accordance with a further embodiment, the transmission module and/or the display modules is/are configured as independent network components. This means that the transmission module and/or the display module is/are able to communicate independently via the data network. The transmission module and/or the display module may be configured in terms of hardware for the communication via the data network and may accordingly comprise a suitable physical interface (PHY interface). A protocol stack required for the communication via the data network may also be implemented in the transmission module and/or the display module.

In accordance with a further embodiment, the display module has one or more interfaces for connecting a monitor or another display unit, wherein the interfaces in particular comprise a DisplayPort (DP), a Serial Digital Interface (SDI), a Mobile Industry Processor Interface (MIPI) and/or a High Definition Multimedia Interface (HDMI) port. The display module may accordingly act as an interface box to connect commercially available monitors or display units.

A further subject of the invention is a display module comprising a network interface that is configured to receive image data, in particular audio data, and metadata via a data network and to enable a display of the image data and the metadata, wherein the display module has an image processing unit that is configured to carry out a modification to the image data before the image data are displayed.

Finally, the invention comprises a method of monitoring during film recordings, in which a transmission module and a display module are connected to one another via a data network, wherein the transmission module transmits image data and preferably also audio data via the data network to the display module, wherein the transmission module additionally transmits metadata to the display module, wherein the display module enables, in particular selectively enables, a display of the image data and the metadata and the display module carries out a modification to the image data before the image data are displayed.

The statements on the monitoring system in accordance with the invention apply accordingly to the display module in accordance with the invention and to the method in accordance with the invention. This in particular applies with respect to advantages and embodiments. It is understood that all the embodiments mentioned herein are combinable with one another, unless explicitly stated otherwise.

The invention will be described purely by way of example with reference to the drawings in the following. In this respect, the modular camera will first be generally described.

Subsequently, the device profiles and the possibility of monitoring on different display modules will be looked at.

Figure 2:
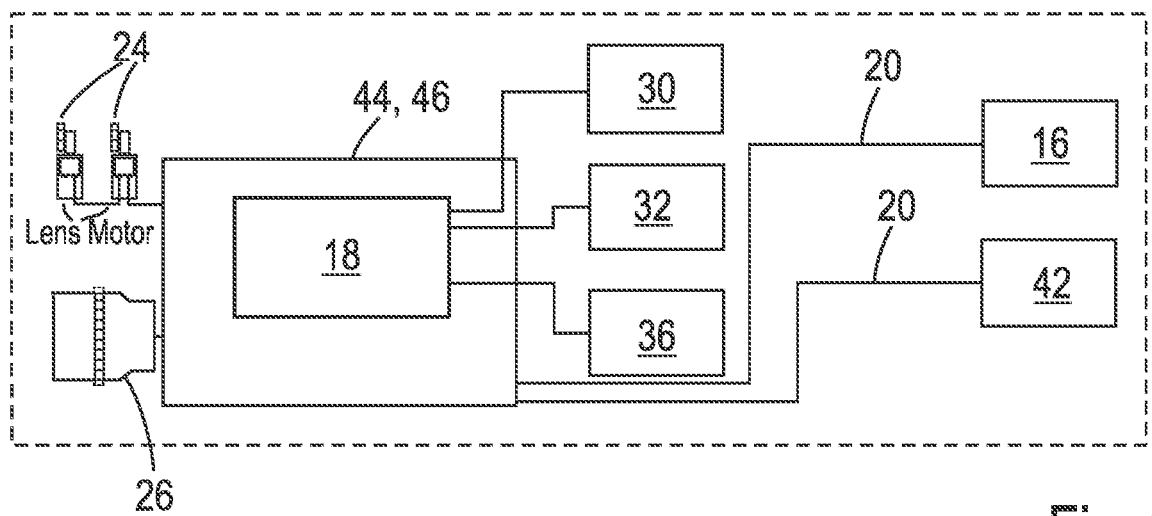
Figure 3:
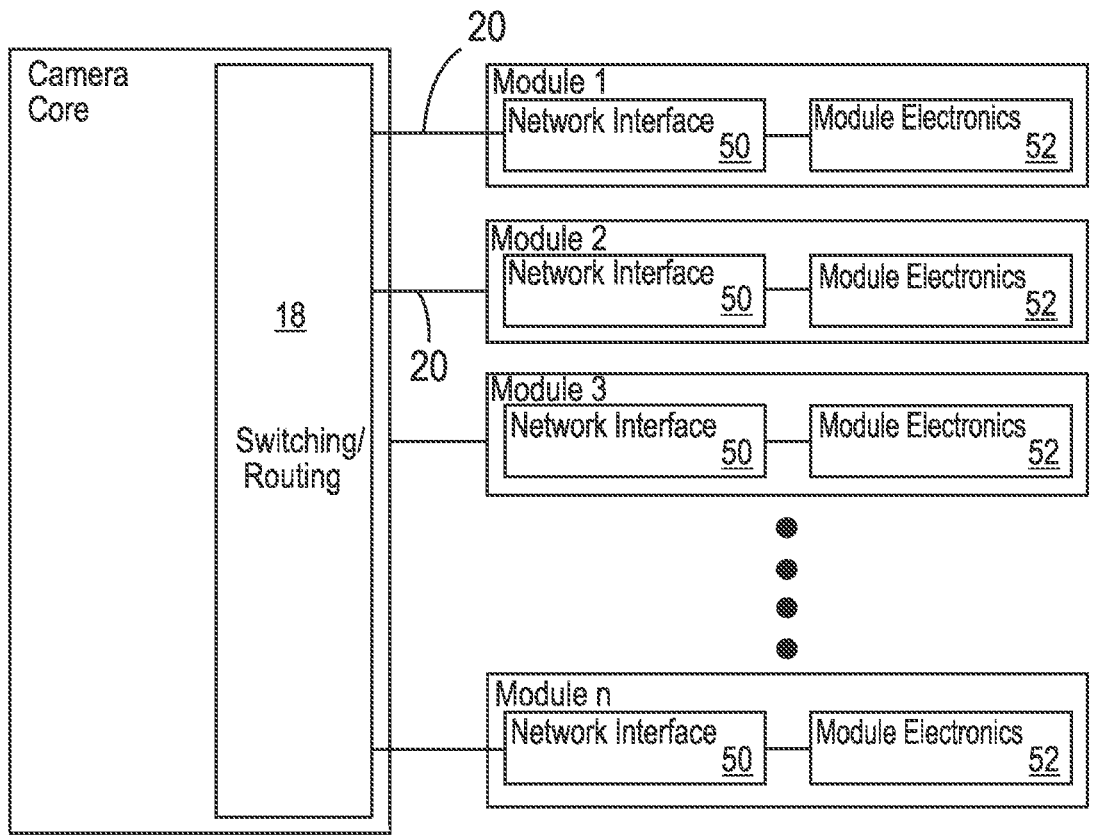
Figure 4:
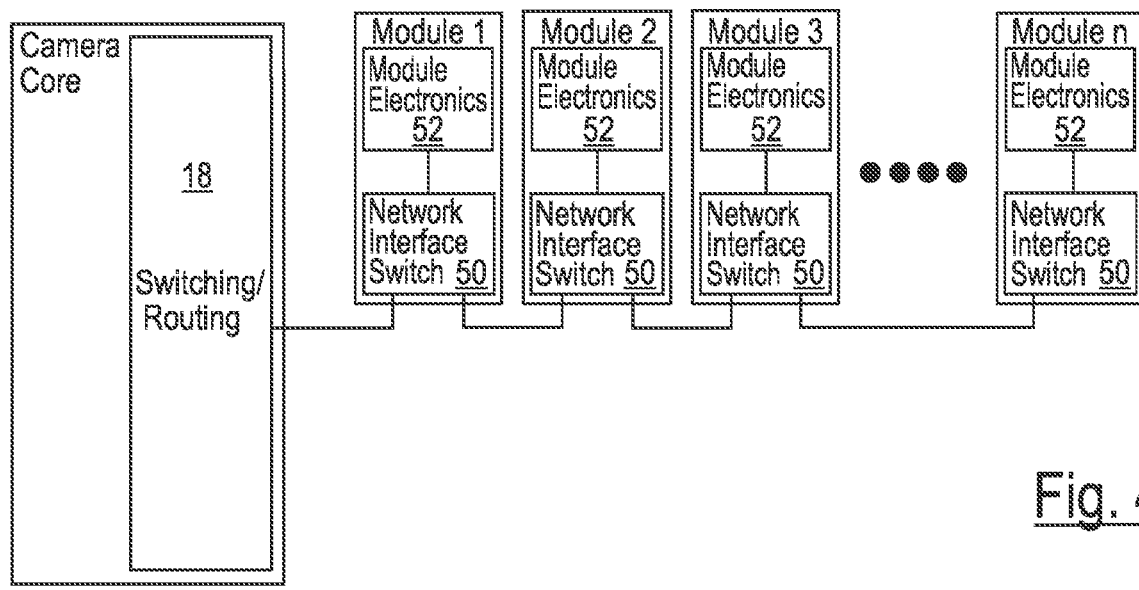
Figure 5:
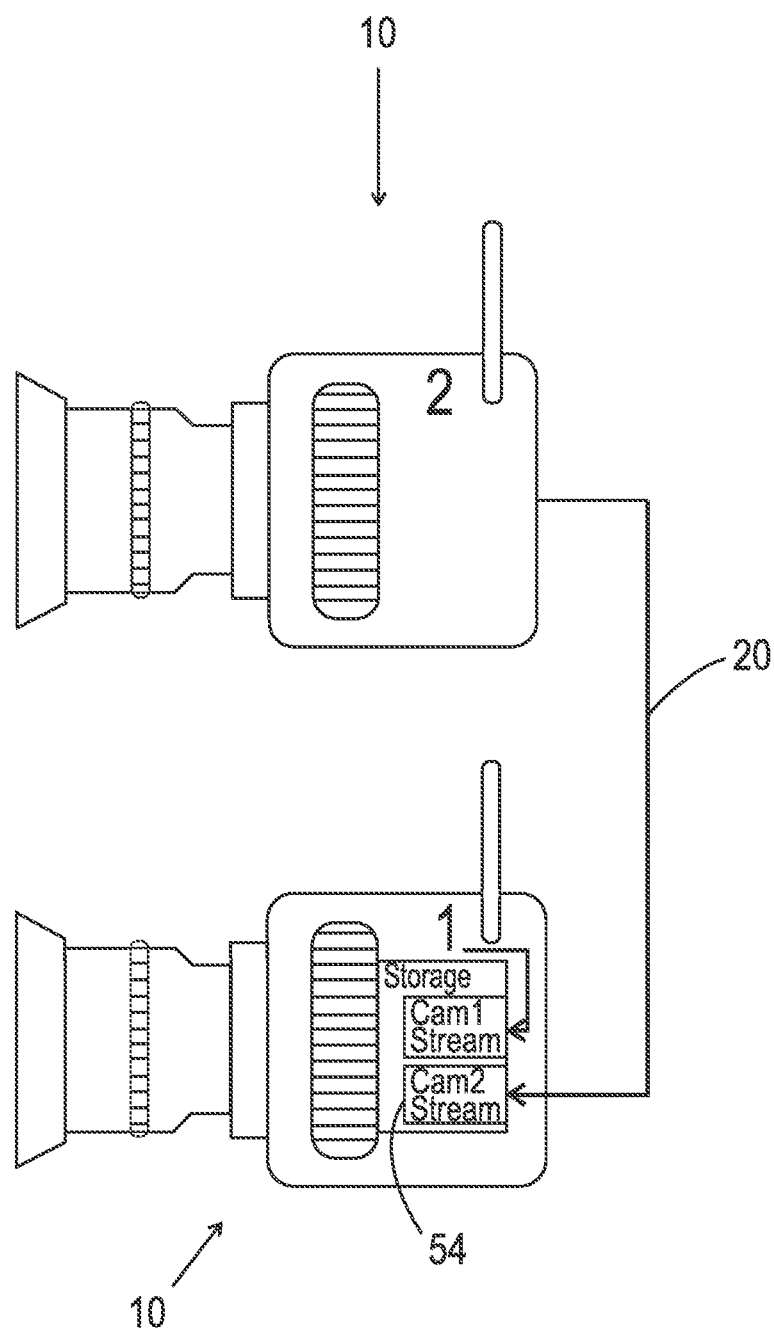
Figure 6:
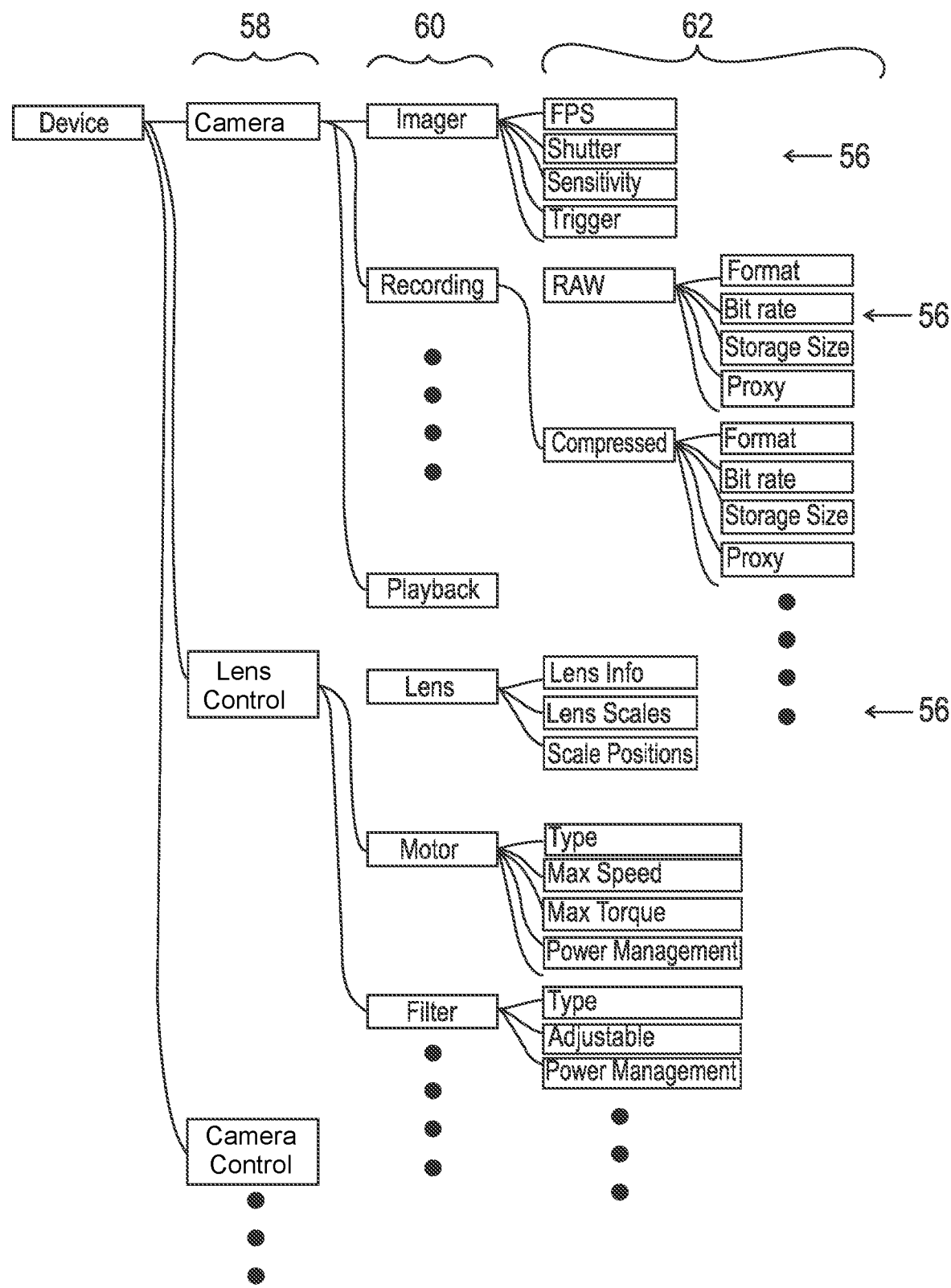
Figure 7:
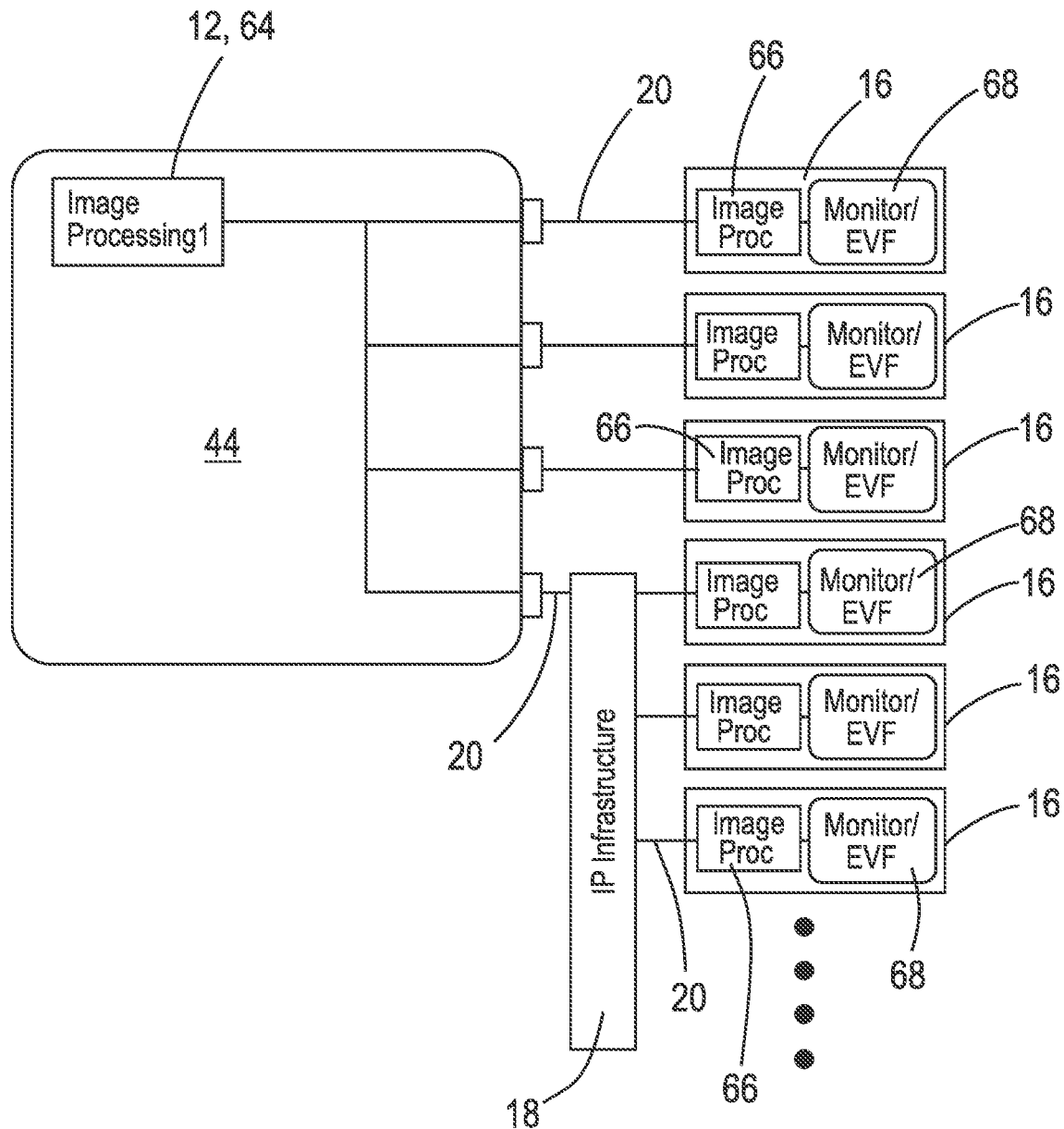

There are shown:

FIG. 1 schematically, a modular electronic camera comprising a distribution unit;

FIG. 2 schematically, the spatial arrangement of the camera modules of the electronic camera of FIG. 1;

FIG. 3 a schematic view of camera modules in accordance with a first embodiment that are connected to a data network;

FIG. 4 schematically, a view of camera modules in accordance with a second embodiment that are connected to a data network;

FIG. 5 the coupling of two cameras via a data network;

FIG. 6 schematically, the division of device profiles into device class and information about the functional scope; and FIG. 7 schematically, display modules that are coupled via a data network and that receive image data from a transmission module.

Figure 8:
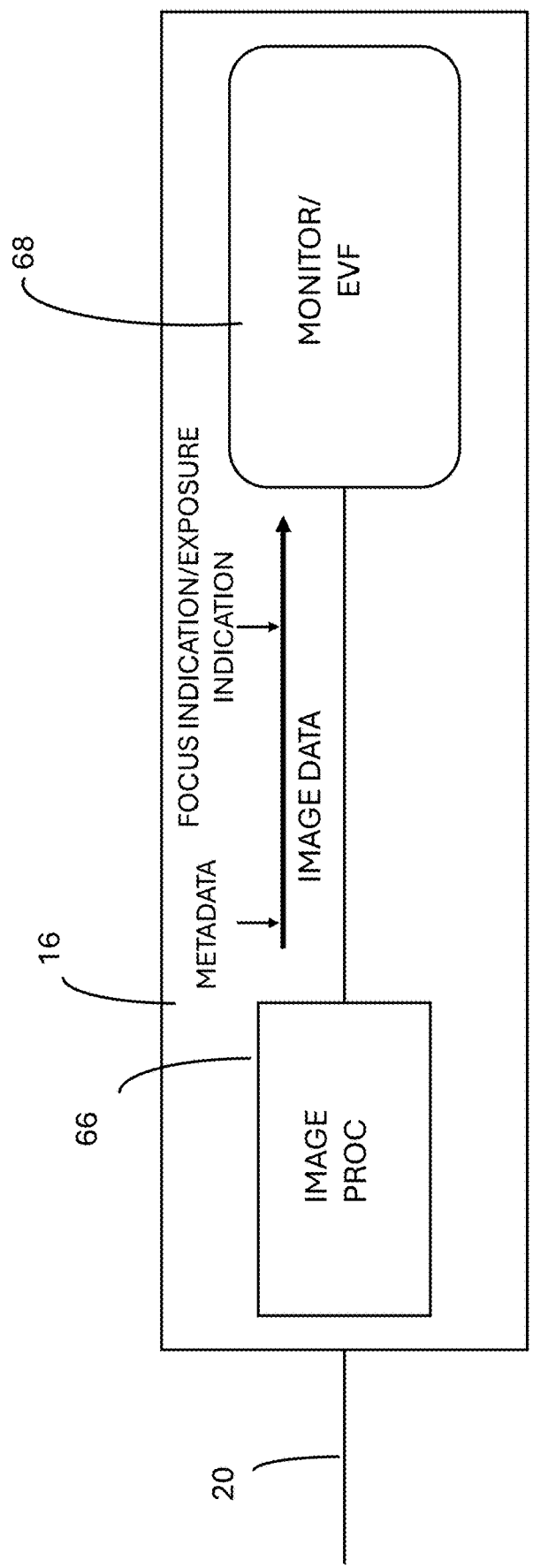

FIG. 8 schematically, a display module superposing at least a portion of metadata and a focus indication and/or an exposure indication on image data during display.

FIG. 1 shows a camera 10 comprising an image acquisition module 12 that has an image sensor and an image processing unit. The camera 10 further comprises an operating module 14 that serves to control and/or to configure the camera 10.

The camera 10 furthermore comprises a display module 16, e.g. a viewfinder, that displays camera images acquired by the image sensor.

The image acquisition module 12, the operating module 14 and the display module 16 are camera modules and are each coupled to a distribution unit configured as a switch 18 via Ethernet connections 20. The operating module 14 and the display module 16 may also be designated as the first and the second functional module.

The camera 10 comprises even further camera modules, namely a lens recording module 22, wherein the lens recording module 22 is divided into a plurality of part modules and has motors 24 for adjusting a lens 26 and a motor control 28 for controlling the motors 24. The motors 24, the lens 26 and the motor control 28 could alternatively also be considered as separate camera modules.

Further camera modules of the camera 10 are a camera positioning module 30, an audio module 32, a processor module 34, a conversion module 36, a radio module 38 and a connection module 40. Finally, the camera 10 may also comprise a second display module 42.

All of the camera modules 12, 14, 16, 22, 30, 32, 34, 36, 38, 40, 42 are coupled to the switch 18 via Ethernet connections 20. The Ethernet connections 20 may be configured as copper cables or also as optical waveguides.

The switch 18 in each case receives data from the camera modules and forwards the data to one or more other camera modules. In this respect, the camera modules use the same data network, namely a data network that is built up from the switch 18 and the Ethernet connections 20 and that transmits data between the camera modules. The data network serves as a data interface between the camera modules. Through a simple connection to the data network, other and/or additional camera modules may thus be integrated into the camera 10.

FIG. 2 shows the spatial arrangement of the camera modules of the camera 10 of FIG. 1. As shown in FIG. 2, the camera 10 comprises a central unit 44 that has a separate housing 46. The switch 18 and all the camera modules not shown outside the central unit 44 are arranged in the central unit 44. The camera positioning module 30, the audio module 32 and the conversion module 36 are arranged outside the housing 46 of the central unit 44. These modules may be mechanically attached to the housing 46 of the central unit 44. In contrast, the display module 16 and the second display module 42 are spaced apart and are attached outside the housing 46 and are in particular only connected via the Ethernet connections 20 to the central unit 44 and thus to the switch 18. Due to the outsourcing of camera modules, the part of the camera 10 that usually has to be moved may be designed as smaller and more manageable.

FIG. 3 and FIG. 4 show two different embodiments of the configuration of the data network. In particular from FIG. 3 and FIG. 4 onward, camera modules are generally shown with the reference numeral 48. In accordance with the first embodiment of FIG. 3, the camera modules 48 each have their own network interface 50, i.e. their own hardware for connecting an Ethernet connection 20. The camera modules 48 furthermore each comprise module electronics 52 that control the communication via the Ethernet connection 20 and that e.g. comprise a protocol stack. In accordance with the embodiment of FIG. 3, the camera modules 48 are each directly connected to the switch 18 via an Ethernet connection 20. In contrast, the camera modules 48 in accordance with the second embodiment of FIG. 4 each comprise the functionality of a hub or a switch in their network interface 50 and may accordingly, as shown in FIG. 4, be connected in the form of a chain. In the embodiment of FIG. 4, only one camera module 48 is directly connected to the switch 18 via an Ethernet connection 20. This directly connected camera module 48 comprises a further Ethernet connection 20 that connects the next camera module 48. Thus, the data of the next camera modules 48 first run via the camera module 48 directly connected to the switch 18 and are then forwarded to the switch 18, if necessary.

FIG. 5 shows the connection of two cameras 10 via an Ethernet connection 20. Due to the Ethernet connection 20 between the two cameras 10, the data networks of the cameras 10 may be connected to one another so that the camera modules 48 of the one camera 10 may access the camera modules 48 of the other camera 10. For example, the camera 10 shown at the bottom in FIG. 5 may have a memory module 54 that is used by both cameras 10 to store the generated image data.

It can be seen that a great flexibility in the structure of the camera 10 may be achieved by the modular design of the camera 10 by means of the camera modules 48. Furthermore, the camera 10 may be kept small and light for the operation so that advantages result on the film set. The data network may furthermore be easily coupled to further cameras to enable an outsourcing of functionalities from one camera 10 to another to allow a synchronization of cameras 10 for 3D recordings or to enable a control of a plurality of cameras 10 from a central point.

Device profiles of camera modules 48 are schematically shown in FIG. 6. The device profiles 56 each comprise a device class 58, i.e., for example, "camera", "lens control" or "camera control". The device classes 58 each also comprise subclasses 60 that define the device class in more detail. Information about the functional scope 62 is specified for each device class 58 and/or for each subclass 60, said information, for example, reproducing the capabilities of a camera, e.g. whether the camera can handle a RAW format or a compressed format.

If it is now assumed by way of example for the camera 10 shown in FIG. 2 that the camera positioning module 30 and the audio module 32 are connected to the camera 10, a connection to the data network or the data interface of the camera is first established by means of the Ethernet connection 20 for the camera positioning module 30 and the audio module 32. A control unit (not shown) of the camera 10, which is, for example, arranged in the central unit 44 or which may be part of the processor module 34, effects the transmission of the device profiles 56 from the camera positioning module 30 and from the audio module 32 to the camera 10 after the connection has been established. The transmission of the device profiles may, for example, take place in the form of an XML file and/or a JSON file.

After receiving the device profiles 56, the device profiles are evaluated and operating parameters of the camera 10 are adapted based on the device profiles 56. Thus, a transmission of audio signals to the audio module 32 may, for example, be activated. Furthermore, the position information output by the camera positioning module 30 may, for example, be forwarded to the processor module 34. To set up such data connections, the operating parameters of the camera 10 are changed accordingly.

Finally, in FIG. 7, the display of different variants of camera images is shown. FIG. 7 shows a transmission module 64 that is part of the image acquisition module 12. The transmission module 64 is connected to a plurality of display modules 16 via the data network, i.e. via Ethernet connections 20. A portion of the display modules 16 is directly connected to the central unit 44. Another portion of the display modules 16 is connected to the transmission module 64 via a further switch 18. Further display modules 16 may in particular be connected via the further switch 18 so that the number of display modules may be easily scaled.

Each of the display modules comprises an image processing unit 66.

During the operation of the camera 10, image data generated by the image acquisition module 12 are transmitted from the transmission module 64 to the display modules 16, wherein the transmission module 64 only performs a scaling and/or a compression of the image data. The image data are received from the display modules 16 and are in each case modified by means of the image processing unit 66 before the image data are displayed on displays 68 of the display modules 16. For example, a color grading, a false color representation, the display of overlays and the like may be performed by the image processing units 66. As shown in FIG. 8, at least a portion of metadata, a focus indication and/or an exposure indication may be superposed on the image data during the display.

Due to the network-based playout of the image data, it is possible to simultaneously provide different display modules 16 with image data without placing a high load on the computing resources of the camera 10. A flexible design of the monitoring for different application purposes is thus made possible.

REFERENCE NUMERAL LIST 10 camera
12 image acquisition module
14 operating module
16 display module
18 switch
20 Ethernet connection
22 lens recording module
24 motor
26 lens
28 motor control
30 camera positioning module
32 audio module
34 processor module
36 conversion module
38 radio module
40 connection module
42 second display module
44 central unit
46 housing
48 camera module
50 network interface
52 module electronics
54 memory module
56 device profile
58 device class
60 subclass
62 information about the functional scope
64 transmission module
66 image processing unit
68 display

The invention claimed is:

1. A distributed monitoring system for film recordings comprising:
a transmission module and a display module, wherein the transmission module and the display module are connected to one another via a data network, wherein the transmission module is configured to transmit image data via the data network to the display module, wherein the transmission module additionally transmits metadata to the display module, wherein the display module is configured to enable a display of the image data and the metadata, and
the display module has an image processing unit that is configured to carry out a modification to the image data before the image data are displayed,
wherein the transmission module is further configured to transmit audio data via the data network to the display module, and
wherein the transmission module is configured to transmit the image data, the audio data and/or the metadata in separate data streams via the data network wherein the data network comprises a network switch, a hub, a router and/or a gateway; and
wherein it is possible for the transmission module to simultaneously transmit image data of different variants of the image data in different data streams via the data network.

2. The monitoring system in accordance with claim 1, wherein the modification to the image data comprises a change in the resolution, a change in the color space, a change in the image refresh rate, a color change and/or a false color representation.

3. The monitoring system in accordance with claim 2, wherein the image processing unit is configured to apply a lookup table to the image data in order to change the color space and/or for the color change.

4. The monitoring system in accordance with claim 1, wherein the display module is configured to superpose at least a portion of the metadata on the image data during the display.

5. The monitoring system in accordance with claim 4, wherein the display module is further configured to superpose a focus indication and/or an exposure indication on the image data.

6. The monitoring system in accordance with claim 1, wherein the metadata comprise camera status information, color space information, focus information, exposure information and/or waveform information.

7. The monitoring system in accordance with claim 1, wherein the display module and the transmission module are configured to communicate bidirectionally with one another via the data network.

8. The monitoring system in accordance with claim 1, wherein the display module is configured to request the transmission of the image data and/or of the metadata in the transmission module.

9. The monitoring system in accordance with claim 1, wherein the transmission module is a camera or is part of a camera, wherein the image data have been acquired by an image sensor of the camera.

10. The monitoring system in accordance with claim 9, wherein the transmission module is configured to output the image data directly via the data network after the acquisition by the image sensor.

11. The monitoring system in accordance with claim 9, wherein the transmission module is configured to transmit the image data via the data network at a frame rate that corresponds to the frame rate on the acquisition by the image sensor or to the frame rate of an image acquisition module.

12. The monitoring system in accordance with claim 9, wherein the camera is a modular electronic camera,
wherein the camera has the image acquisition module comprising the image sensor and an image processing unit coupled to the image sensor,
wherein the camera comprises a functional module, wherein the image acquisition module, the functional module and the display module are camera modules, wherein the image acquisition module, the operating module and the display module are connected to one another by means of the data network, wherein the data network has a distribution unit that is configured to receive data via the data network from the camera modules and to forward data from one of the camera modules to at least one of the other camera modules.

13. The monitoring system in accordance with claim 12, wherein the camera is a distributed electronic camera.

14. The monitoring system in accordance with claim 12, wherein the functional module is an operating module for controlling and/or configuring the camera.

15. The monitoring system in accordance with claim 1, wherein the transmission module is configured to scale and/or to compress the image data.

16. The monitoring system in accordance with claim 15, wherein the transmission module is configured to scale and/or to compress the image data only to scale and/or to compress the image data.

17. The monitoring system in accordance with claim 15, wherein the transmission module is configured to perform the scaling and/or compression of the image data based on the settings of the display of the image data on the display module.

18. The monitoring system in accordance with claim 1, wherein the transmission module is configured to transmit the image data, the audio data and/or the metadata in separate data streams via the data network in synchronized data packets.

19. The monitoring system in accordance with claim 1, wherein the image data have a color space that is larger than the color space of Rec. 709.

20. The monitoring system in accordance with claim 1, wherein the monitoring system comprises one or more further display modules that are connected to the transmission module via the data network, wherein the further display modules are configured to display the image data and the metadata, and the further display modules each have a separate image processing unit that is in each case configured to carry out a modification to the image data before the image data are displayed.

21. The monitoring system in accordance with claim 1, wherein at least one network component for distributing the image data, audio data and/or metadata is interposed between the transmission module and the display module in the data network.

22. The monitoring system in accordance with claim 21, wherein the network component comprises a network switch, a hub, a router and/or a gateway.

23. The monitoring system in accordance with claim 20, wherein the display modules are configured to display the image data in a synchronized manner.

24. The monitoring system in accordance with claim 20, wherein at least one network component for distributing the image data, audio data and/or metadata is interposed between the transmission module and the display module in the data network and wherein the display modules are configured to display the image data in a synchronized manner.

25. The monitoring system in accordance with claim 1, wherein the data network comprises an Ethernet network, a fieldbus network or a non-IP network or is such a network.

26. The monitoring system in accordance with claim 1, wherein the transmission module and/or the display modules is/are configured as independent network components.

27. The monitoring system in accordance with claim 1, wherein the display module has one or more interfaces for connecting a monitor.

28. The monitoring system in accordance with claim 27, wherein the interfaces comprise a DisplayPort, a Serial Digital Interface, a Mobile Industry Processor Interface and/or a High Definition Multimedia Interface port.

29. A method of monitoring during film recordings, in which a transmission module and a display module are connected to one another via a data network, wherein the transmission module transmits image data via the data network to the display module, wherein the transmission module additionally transmits metadata to the display module, wherein the display module enables a display of the image data and the metadata, and
the display module carries out a modification to the image data before the image data are displayed,
wherein the transmission module further transmits audio data via the data network to the display module, and
wherein the transmission module transmits the image data, the audio data and/or the metadata in separate data streams via the data network wherein the data network comprises a network switch, a hub, a router and/or a gateway; and wherein it is possible for the transmission module to simultaneously transmit image data of different variants of the image data in different data streams via the data network.

30. A distributed monitoring system for film recordings comprising:
a transmission module and a display module, wherein the transmission module and the display module are connected to one another via a data network, wherein the transmission module is configured to transmit image data via the data network to the display module, wherein the transmission module additionally transmits metadata to the display module, wherein the display module is configured to enable a display of the image data and the metadata, and the display module has an image processing unit that is configured to carry out a modification to the image data before the image data are displayed, wherein the transmission module is a camera or is part of a camera, wherein the image data have been acquired by an image sensor of the camera, wherein the camera is a modular electronic camera, wherein the camera has an image acquisition module comprising the image sensor and an image processing unit coupled to the image sensor, wherein the camera comprises a functional module, wherein the functional module is an operating module for controlling and/or configuring the camera, wherein the image acquisition module, the functional module and the display module are camera modules, wherein the image acquisition module, the operating module and the display module are connected to one another by means of the data network, and wherein the data network has a distribution unit that is configured to receive data via the data network from the camera modules and to forward data from one of the camera modules to at least one of the other camera modules wherein the data network comprises a network switch, a hub, a router and/or a gateway; and wherein it is possible for the transmission module to simultaneously transmit image data of different variants of the image data in different data streams via the data network.

* * * * *